US008776584B2

(12) United States Patent
Hoehne et al.

(10) Patent No.: US 8,776,584 B2
(45) Date of Patent: Jul. 15, 2014

(54) PRESSURE-MEASURING DEVICE AND PRESSURE-MEASURING METHOD FOR A TURBOMACHINE

(71) Applicant: Rolls-Royce Deutschland Ltd & Co KG, Blankenfelde-Mahlow (DE)

(72) Inventors: Peter Hoehne, Fredersdorf (DE); Frank Schroer, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 0 days.

(21) Appl. No.: 13/692,670

(22) Filed: Dec. 3, 2012

(65) Prior Publication Data

US 2013/0139578 A1    Jun. 6, 2013

(30) Foreign Application Priority Data

Dec. 1, 2011    (DE) .......................... 10 2011 087 599

(51) Int. Cl.
*G01M 15/14*    (2006.01)
*G01L 23/22*    (2006.01)

(52) U.S. Cl.
CPC ............... *G01L 23/22* (2013.01); *G01M 15/14* (2013.01); *F23N 2041/20* (2013.01)
USPC ..................................................... 73/112.01

(58) Field of Classification Search
USPC ..................................................... 73/112.01
See application file for complete search history.

(56) References Cited

U.S. PATENT DOCUMENTS

| | | | |
|---|---|---|---|
| 5,049,063 A * | 9/1991 | Kishida et al. | 431/78 |
| 5,801,534 A | 9/1998 | Hohner et al. | |
| 5,814,994 A | 9/1998 | Hohner et al. | |
| 6,018,986 A | 2/2000 | Ottosson et al. | |
| 6,155,241 A | 12/2000 | Hohner et al. | |
| 6,993,960 B2 * | 2/2006 | Benson | 73/112.01 |
| 7,096,722 B2 * | 8/2006 | Benson et al. | 73/114.08 |
| 7,204,133 B2 * | 4/2007 | Benson et al. | 73/112.01 |
| 7,845,937 B2 | 12/2010 | Hammer et al. | |
| 2004/0123652 A1 * | 7/2004 | Benson et al. | 73/118.1 |
| 2006/0000260 A1 | 1/2006 | Benson et al. | |
| 2010/0158670 A1 | 6/2010 | Fox | |

FOREIGN PATENT DOCUMENTS

| | | |
|---|---|---|
| DE | 19524540 | 6/1996 |
| DE | 69608677 | 10/1996 |
| DE | 19524539 | 11/1996 |
| DE | 19524541 | 12/1996 |
| DE | 19614288 | 8/1997 |
| DE | 19720535 | 11/1998 |
| DE | 20000600 | 4/2000 |
| DE | 19924682 | 12/2000 |
| DE | 102004061300 | 7/2006 |

* cited by examiner

*Primary Examiner* — Freddie Kirkland, III
(74) *Attorney, Agent, or Firm* — Timothy J. Klima; Shuttleworth & Ingersoll, PLC

(57) ABSTRACT

A pressure-measuring device and a pressure-measuring method for measuring a pressure in a combustion chamber of a turbomachine are provided. The pressure-measuring device includes at least one sensor device for measuring an ion current at at least one point inside the combustion chamber.

21 Claims, 6 Drawing Sheets

PRESSURE-MEASURING DEVICE AND PRESSURE-MEASURING METHOD FOR A TURBOMACHINE

CROSS-REFERENCE TO RELATED APPLICATION

This application claims the benefit of German Patent Application No. 10 2011 087 599.9 filed on Dec. 1, 2011, the entirety of which is fully incorporated herein by reference.

BACKGROUND

This invention relates to a pressure-measuring device and to a pressure-measuring method.

For environmental protection reasons, the purpose is to reduce emissions from turbomachines, such as gas turbines or aircraft engines, for example. It is possible here to combust lean mixtures, i.e. fuel mixtures with a relatively low fuel-to-air ratio, in a combustion chamber of the turbomachine.

This may result in operating states with high pressure peaks or other flow instabilities. The pressure fluctuations are mainly caused here by fluctuations in the heat released during combustion, where the pressure fluctuations can be so great that the combustion chamber or other components of the turbomachine might be damaged. A system for detecting pressure fluctuations of this type is for example known from US 2010/0158670 A1.

SUMMARY

The object is to provide a pressure-measuring device and a pressure-measuring method by which pressure in the combustion chamber can be measured particularly effectively and simply.

According to an exemplary embodiment of the invention, an ion current can be measured at at least one point inside the combustion chamber using at least one sensor device. The ion current, in particular its time-dependent development, is suitable for detecting pressure fluctuations during combustion inside the combustion chamber. The ion current can be directly detected inside the combustion chamber, so that the appropriate measuring signal can be directly generated at the combustion chamber.

In at least one advantageous embodiment, the at least one sensor device has an electrode pair using which the ion current in the combustion chamber can be measured. Alternatively or additionally, an igniter in the combustion chamber can have the at least one sensor device. Since an igniter has an electrode pair anyway, a particularly efficient measurement of the ion current can be achieved in this way.

It is advantageous here when with one embodiment dynamic changes of the ion current can be detected by a control device. Conclusions can be drawn as to the nature of the pressure fluctuations from changes in the measuring signal, for example the amplitude and/or the frequency.

If in one exemplary embodiment at least two sensor devices are used, spatial differences of the ion current in the combustion chamber can be detected. The combustion in the combustion chamber has differently shaped combustion zones in differing operating states, so that spatial detection of the ion current permits more targeted statements to be made about combustion.

It is particularly advantageous here when in one exemplary embodiment, the ion current measuring signal generated using the at least one sensor device is used by a burner control for regulating combustion.

It is also advantageous when the measuring signal for the ion current can be processed by a signal-processing device, in particular with a fast Fourier analysis. This allows harmless fluctuations to be distinguished from harmful fluctuations. It is particularly advantageous here when the signal-processing device compares the measuring signal for the ion current with a predefined threshold value and controls combustion as a function thereof.

The pressure-measuring device can be used particularly advantageously for lean combustion, in particular when combustion in the combustion chamber develops with an equivalence ratio in the range $0.5 \ll 1$.

It is also advantageous when an embodiment of the pressure-measuring device is linked to a combustion chamber of an aircraft engine.

Solution is also provided by a pressure-measuring method. Advantageous embodiments of the pressure-measuring method become apparent from the sub-claims.

BRIEF DESCRIPTION OF THE DRAWINGS

The invention is described in light of the figures showing exemplary embodiments.

DETAILED DESCRIPTION

Figure 6:
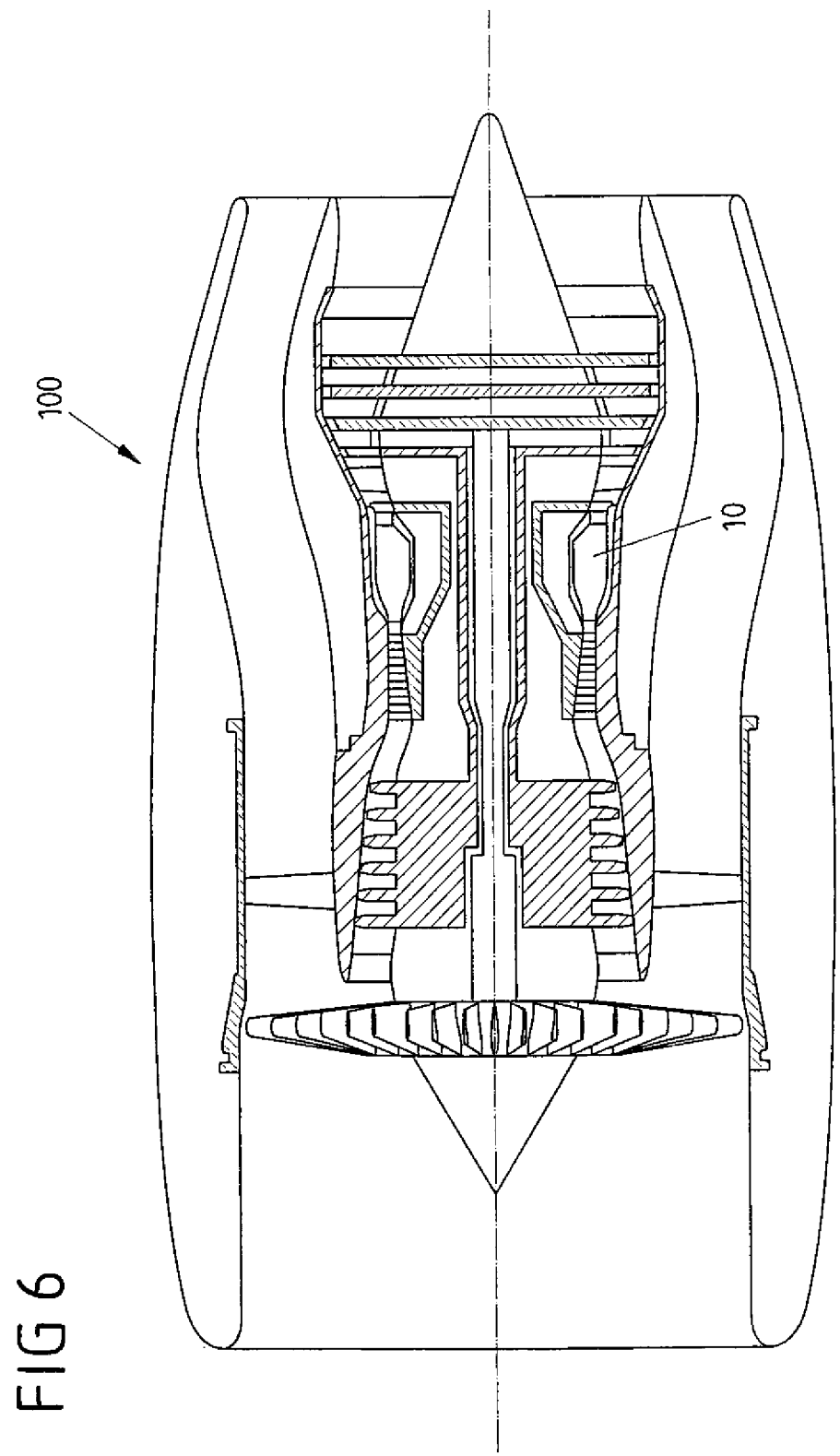
FIG. 6 shows a perspective representation of an aircraft engine.

Firstly, the chemical conditions during combustion are considered before turning to embodiments of the pressure-measuring device. Reference is made here as an example to a combustion chamber 10 in an aircraft engine 100 (see FIG. 6). In principle, the pressure-measuring device can however also be used in other turbomachines, such as gas turbines for example.

In a combustion chamber 10, a mixture of air and fuel is combusted and hence the chemical energy contained in the fuel is converted into heat.

The fuel used for example in an aircraft engine 100 is kerosene, which is converted by oxidation into carbon dioxide $CO_2$ and steam $H_2O$. For a stoichiometric, i.e. complete combustion, 18 moles of oxygen are needed for one mole of kerosene $C_{12}E_{24}$.

The fuel-air ratio for a stoichiometric combustion is $_{stoich}=0.068067$. For complete combustion, 1 g of fuel and 3.42 g of oxygen (14.7 g of air) is needed. If $>_{stoich}$ in a combustion zone 12 of the combustion chamber, there is an excess of fuel and hence a rich mixture. If $<_{stoich}$ in the combustion zone 12 of the combustion chamber 10, there is a lean mixture.

With over-stoichiometric combustion, residues are left behind, for example as carbon monoxide or in the form of uncombusted hydrocarbons, which leave the combustion chamber 10 as pollutants. If the fuel-air ratio $\lambda_{BK}$ in the combustion chamber 10 is set in relation to the stoichiometric ratio, an equivalence ratio $=\lambda_{BK}/\lambda_{stoich}$ can be defined, i.e. with <1 there is a lean mixture.

The equivalence ratio cannot be arbitrarily low here, since beyond a certain ratio—depending on temperature and pressure—the fuel mixture can no longer be ignited.

With a lean mixture, considerable pressure fluctuations can occur due to inhomogeneities during heat release.

Figure 1:
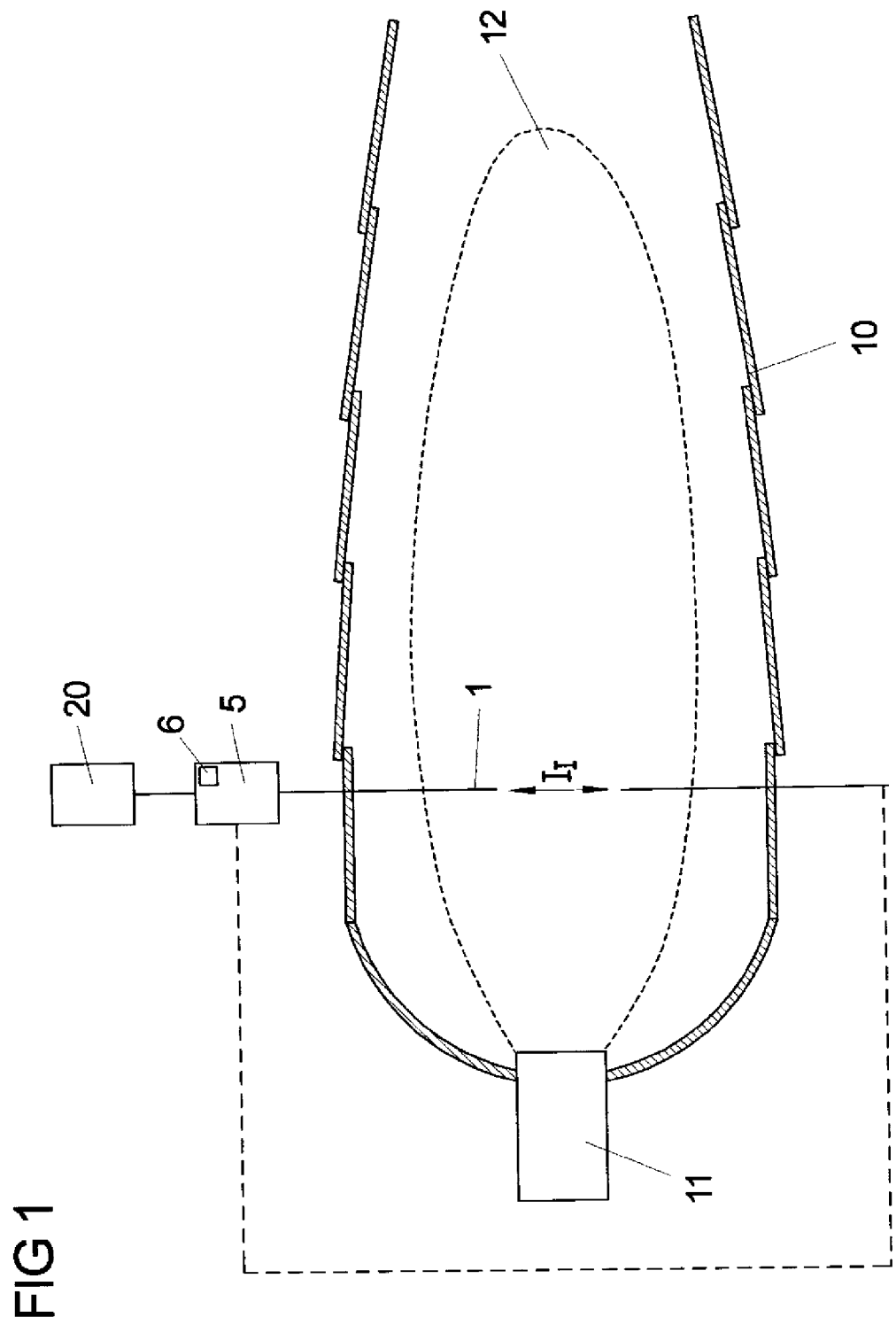
FIG. 1 shows a basic structure of a combustion chamber of a turbomachine with an embodiment of a pressure-measuring device.

FIG. 1 shows schematically a pressure-measuring device by which the pressure fluctuations in the combustion chamber 10 can be efficiently detected by an ion current measurement. A combustion zone 12 extends from a burner 11 into the combustion chamber 10 during operation.

In a combustion chamber 10, temperatures of up to 2400 K occur during combustion. At these high temperatures, the fuel-air mixture is partially ionized, i.e. electrically conductive.

A sensor device 1 having an electrode pair 1 is arranged in the combustion chamber 10.

An electrode pair 1 is electrically insulated from the combustion chamber 10 and connected to a control device 5 that applies a DC voltage to the electrode pair 1. At the electrode pair 1 supplied with DC voltage, the ion current $I_I$ inside the combustion zone 12 is measured. The size of the ion current $I_I$ depends here on the degree of ionization of the combustion gases between the electrode pair 1. Since the electrode pair 1 is arranged in the interior of the combustion chamber 10, the combustion process can be directly monitored. In the embodiment of FIG. 1, the electrode pair 1 is arranged vertically to the flame propagation direction (i.e. in FIG. 1 from the burner 11 to the right-hand side). In principle, it is also possible to arrange additional or alternative electrode pairs along the flame propagation direction.

If sensor devices 1 are arranged at various points in the combustion chamber 10, a dynamic spatial breakdown of the pressure fluctuations can be obtained. The control device 5 can then assign signals to individual areas of the combustion chamber 10, so that the burner control 20 can take targeted measures to suppress unwelcome pressure fluctuations.

Even if it is possible to measure stationary values of the ion current $I_I$, it is still advantageous to measure the dynamic curve of the ion current $I_I(t)$. The dynamic signal of the ion current $I_I(t)$ is supplied to the control device 5, which has a signal-processing device 6 using which a signal for the beginning of unwelcome pressure fluctuations can be generated. Since the potential pressure fluctuations (if required broken down spatially) have certain frequency ranges, it is expedient for the signal-processing device 6 to have the ability for performing a fast Fourier transform (FFT) and suitable filter devices. The signal-processing device 6 furthermore has the ability to classify pressure fluctuations as relevant only above a certain limit value, in order to then control combustion, for example, in a different way.

The control device 5 is connected to a burner control 20 which supplies setting signals to the burner 11 depending on the absolute values determined and or the dynamic curve of the ion current $I_I(t)$.

Figure 2:
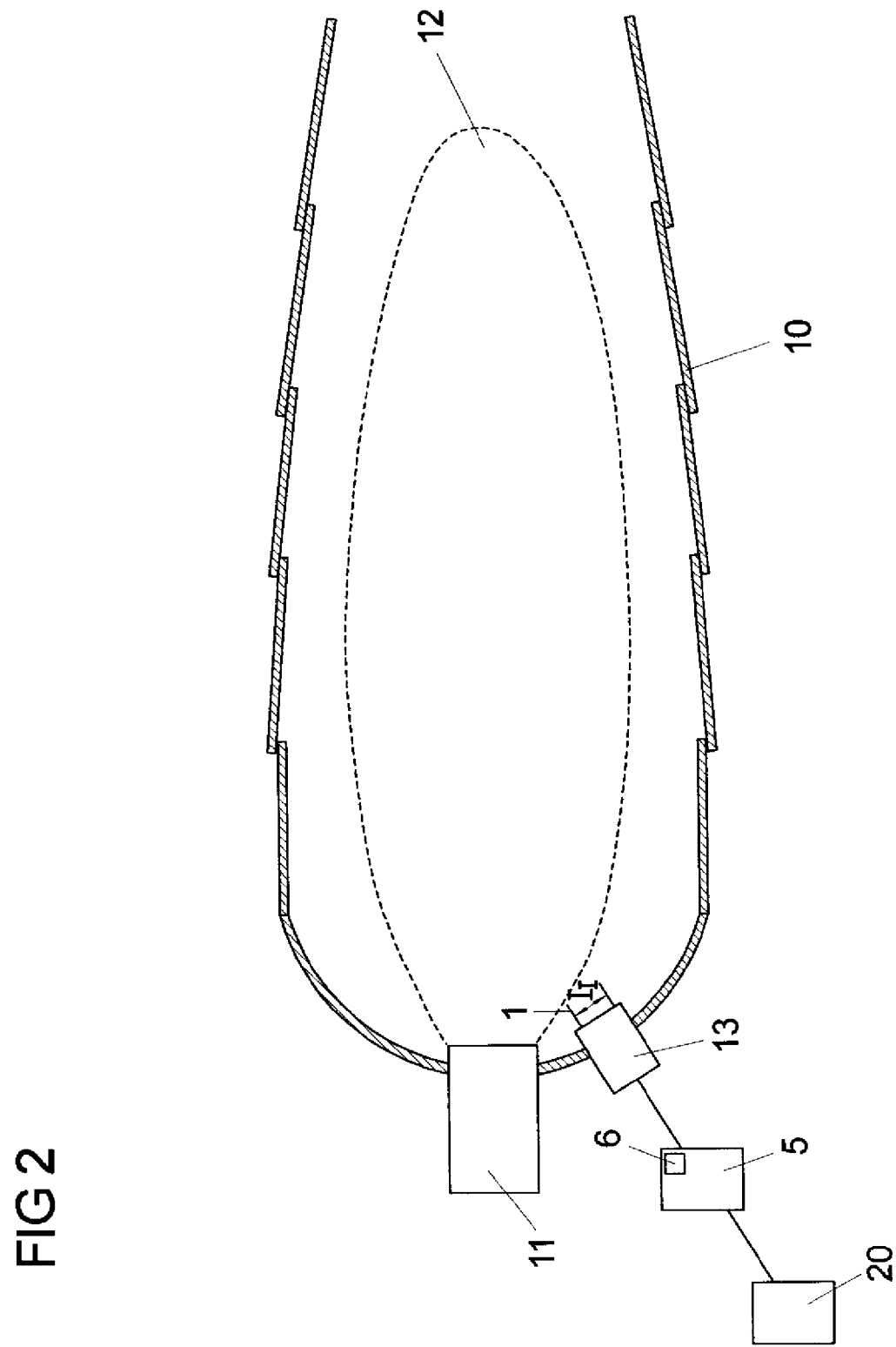
FIG. 2 shows the basic structure of a combustion chamber of a turbomachine with a further embodiment of a pressure-measuring device.

FIG. 2 shows a variant of the embodiment described in FIG. 1, so that as a general principle, reference can be made to the above description.

The difference from the first embodiment (FIG. 1) is that an igniter 13 already provided in an aircraft engine 100 includes the sensor device 1 for measurement of the ion current $I_I$.

Typically, igniter plugs with an inner electrode made of an iron-nickel material and an outer earthed electrode made of steel are used as igniters 13. The two electrodes that together form an electrode pair 1 are separated from one another by a ceramic insulator. The electrode pair 1 of the igniter 13 is used in certain operating phases (for example during starting or when there is water in the aircraft engine 100) to ignite a flame.

Hence an already provided component, i.e. the igniter 13, can be used as a pressure-measuring device. Since in an aircraft engine 100 the igniter 13 must only be used for ignition in certain operating ranges, it is available most of the time as a measuring instrument. The power supply for ignition of the flame can thus act as a current source for the electrode pair 1 when a measuring of the ion current $(I_i)$ is performed.

The igniter 13 and its electrode pair 1 usually does not project directly into the combustion zone 12, so that the ion current is measured outside the combustion zone 12. This however still permits conclusions to be drawn about pressure fluctuations inside the combustion chamber 10.

It is also possible to combine the embodiments according to FIG. 1 and FIG. 2 with one another.

Figure 3:
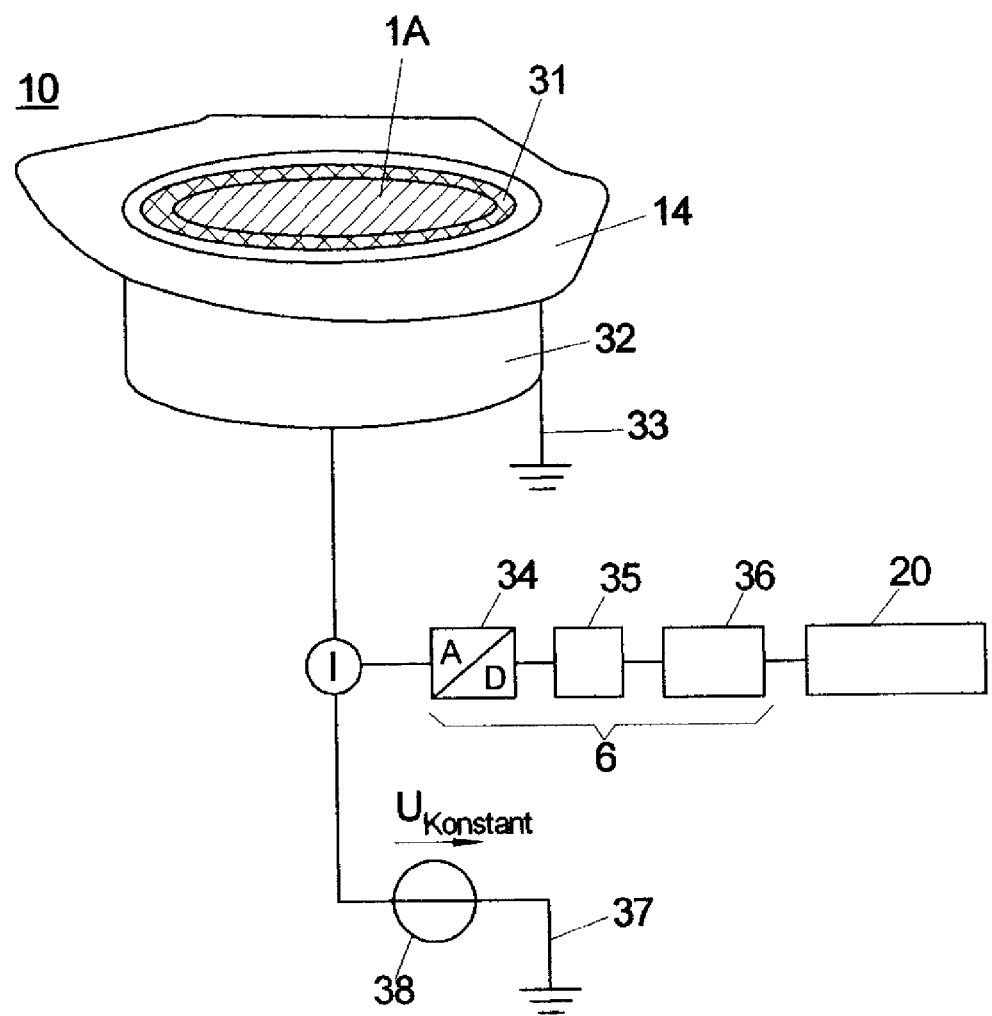
FIG. 3 shows a schematic representation of a first embodiment of the pressure-measuring device with one electrode, which is individually insulated against earth.
Figure 4:
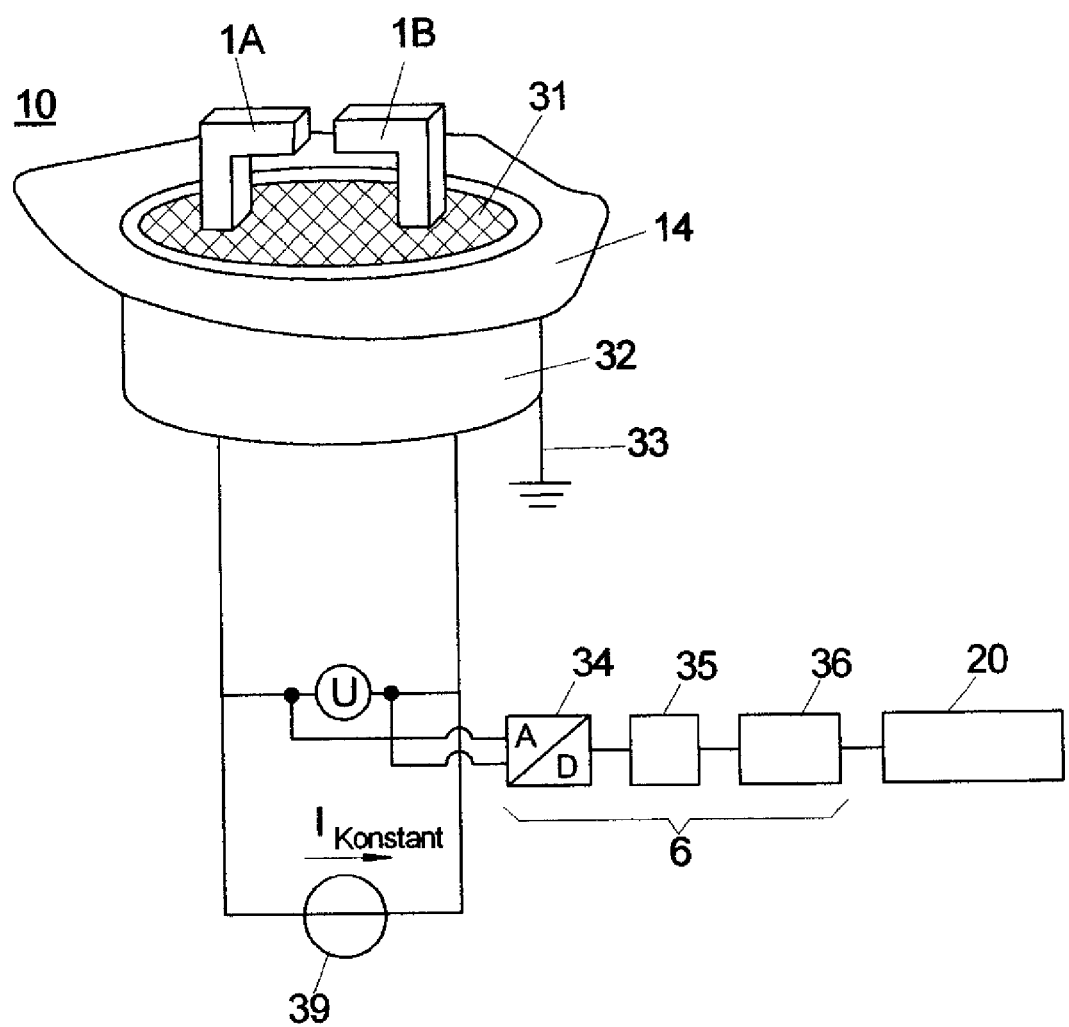
FIG. 4 shows a schematic representation of a second embodiment of the pressure-measuring device with two electrodes, which are both insulated against earth.
Figure 5:
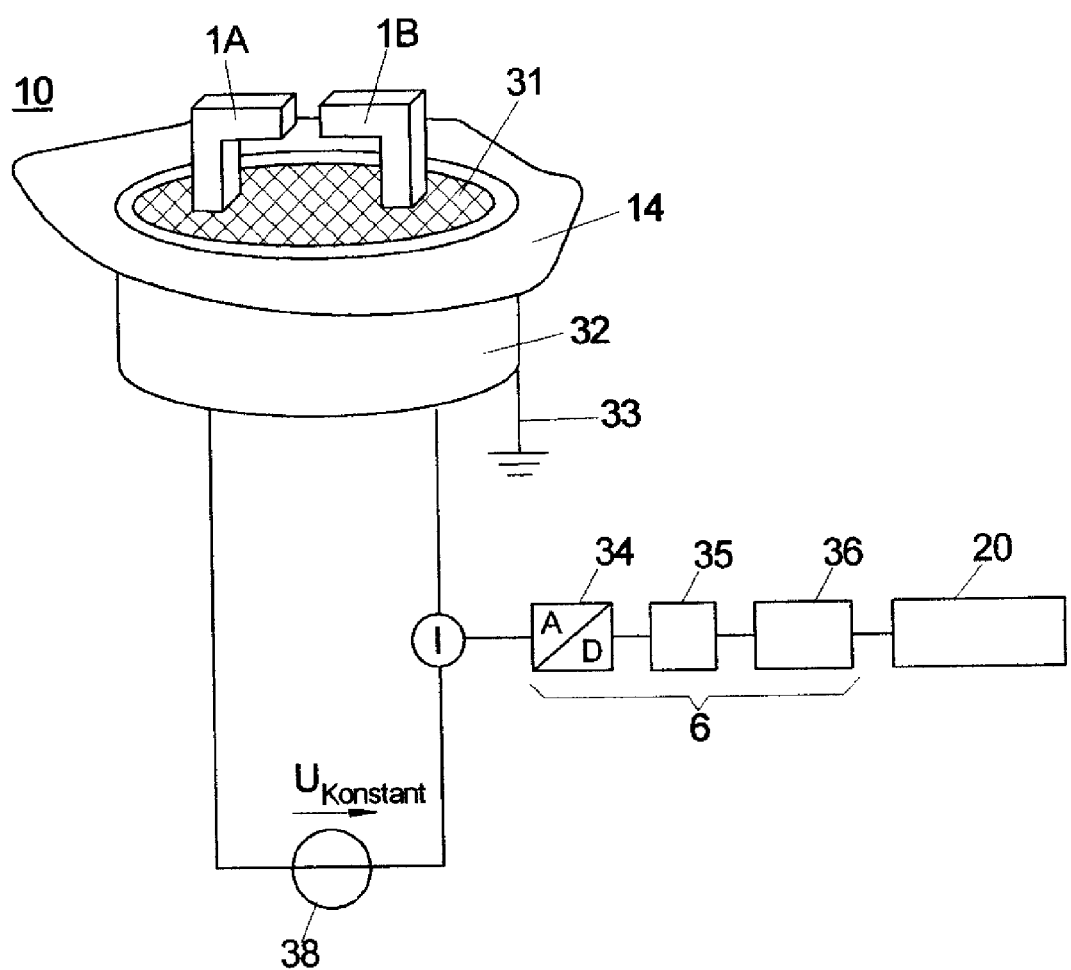
FIG. 5 shows a schematic representation of a third embodiment of the pressure-measuring device with two electrodes, which are both insulated against earth.

FIGS. 3 to 5 show further embodiments. These differ substantially in whether both electrodes of the sensor device 1 or only one electrode of the sensor device 1 are insulated from the casing of the combustion chamber 10. The electrodes should here project from the combustion chamber wall 14 into the combustion chamber. This ensures that the electrodes come into contact with ionized gas.

FIG. 3 shows a first embodiment in which an electrode 1A of tungsten is provided as a part of a sensor device 1 for ion current measurement and projects through a combustion chamber wall 14 into the combustion chamber 10. The combustion chamber 10 is arranged here above the electrode 1. The rod-like electrode 1A is surrounded by an insulator 31, so that the electrode 1A is electrically insulated from a casing 32. The casing 32 has an earth connection 33 and is integrated into the combustion chamber wall 14.

The electrode 1A is hence individually insulated against earth.

A signal-processing device 6 whose function is described in the following measures the current flow to the electrode 1A, which is supplied by a constant voltage source 38. The constant voltage source has an earth connection 37.

The signal-processing device 6 has an A/D converter 34 which converts the analogically measured current signal into a digital signal. The digital signal is then subjected in a fast Fourier transform analyzer 35 to an FFT, with the evaluated FFT signal being processed in an evaluation unit 36. The result is then made available to the burner control 20, which can set burner parameters depending on the processed current measurement.

FIG. 4 shows a second embodiment. Unlike in the first embodiment, an electrode pair 1A, 1B made of tungsten is used for ion current measurement. The two electrodes 1A, 1B are embedded in an insulator 31 that electrically insulates the electrodes from the casing 32. The casing 32 is again integrated into the combustion chamber wall 14 and has an earth connection. Both electrodes 1A, 1B are connected to a constant current source 39.

In this embodiment, the signal-processing device 6 does not evaluate the current flow, but evaluates the voltages between the two electrodes 1A, 1B. The evaluation per se is performed as in the first embodiment, so reference can be made to the description thereof.

FIG. 5 shows a combination of the first and second embodiments. As in the second embodiment, two electrodes 1A, 1B are used, which however are connected to a constant voltage source 38. The integration of the electrodes 1A, 1B into the combustion chamber wall 14 matches that in the second embodiment.

The evaluation of the measuring signal by the signal-processing device 6 however follows the first embodiment, since here the current signal is again evaluated in the electrode line. The function of the signal-processing device 6 was already described in connection with the first embodiment.

LIST OF REFERENCE NUMERALS

1 Sensor device for ion current, electrode pair
1A First electrode of a sensor device
1B Second electrode of a sensor device
5 Control device
6 Signal-processing device
10 Combustion chamber
11 Burner
12 Combustion zone
13 Igniter
14 Combustion chamber wall
20 Burner control
31 Insulator
32 Casing of an electrode
33 Earth connection of casing
34 ND converter
35 FFT analyzer
36 Evaluation unit
37 Earth connection
38 Constant voltage source
39 Constant current source
100 Aircraft engine

The invention claimed is:

1. A pressure-measuring device for measuring a pressure in a combustion chamber of a turbomachine, comprising:
at least one sensor device for measuring an ion current positioned at at least one point inside the combustion chamber;
a constant current source;
wherein the at least one sensor device includes two electrodes which are insulated against earth and arranged in a combustion chamber wall, with the two electrodes being coupled to the constant current source.

2. The pressure-measuring device in accordance with claim 1, wherein the at least one sensor device has an electrode pair for measuring the ion current in the combustion chamber.

3. The pressure-measuring device in accordance with claim 1, wherein an igniter in the combustion chamber has the at least one sensor device.

4. The pressure-measuring device in accordance with claim 1, and further comprising a control device for detecting dynamic changes of the ion current using the at least one sensor device.

5. The pressure-measuring device in accordance with claim 1, and further comprising at least two sensor devices by which spatial differences of the ion current in the combustion chamber can be detected.

6. The pressure-measuring device in accordance with claim 1, and further comprising a burner control for regulating combustion, wherein the at least one sensor device generates a measuring signal for the ion current for use by the burner control for regulating combustion.

7. The pressure-measuring device in accordance with claim 1, and further comprising a signal processing device having a fast Fourier analyzer for analyzing the measuring signal for the ion current.

8. The pressure-measuring device in accordance with claim 7, wherein the signal-processing device compares the measuring signal for the ion current with a predefined threshold value for controlling combustion as a function thereof.

9. The pressure-measuring device in accordance with claim 1, wherein the combustion in the combustion chamber is performed as a lean combustion having an equivalence ratio in a range $0.5 < \phi < 1$.

10. The pressure-measuring device in accordance with claim 1 combined with a combustion chamber of an aircraft engine.

11. The pressure-measuring device in accordance with claim 1, and further comprising a signal-processing device for detecting a voltage change between the two electrodes of the sensor device.

12. A pressure-measuring method for measuring the pressure in a combustion chamber of a turbomachine, comprising measuring an ion current at at least one point inside the combustion chamber using at least one sensor device; the at least one sensor device having two electrodes which are insulated against earth and arranged in a combustion chamber wall, measuring the ion current by detecting a voltage change between the two electrodes of the sensor device.

13. The pressure-measuring method in accordance with claim 12, wherein the ion current is measured in the combustion chamber using an electrode pair of the at least one sensor device.

14. The pressure-measuring method in accordance with claim 12, and further comprising using an igniter in the combustion chamber as the at least one sensor device for measuring the ion current.

15. The pressure-measuring method in accordance with claim 12, and further comprising using a control device for detecting dynamic changes of the ion current sensed by the at least one sensor device.

16. The pressure-measuring method in accordance with claim 12, and further comprising detecting spatial differences of ion current measurements using at least two sensor devices in the combustion chamber.

17. The pressure-measuring method in accordance with claim 12, and further comprising using the at least one sensor device for generating a measuring signal for the ion current, and using the measuring signal in a burner control for regulating combustion.

18. The pressure-measuring method in accordance with claim 12, and further comprising using the at least one sensor device for generating a measuring signal for the ion current and processing the measuring signal in a signal-processing device, performing a fast Fourier analysis.

19. The pressure-measuring method in accordance with claim 18, and further comprising using the signal-processing device for comparing the measuring signal for the ion current with a predefined threshold value and controlling combustion as a function thereof.

20. The pressure-measuring method in accordance with claim 12, and further comprising performing combustion in the combustion chamber as a lean combustion having an equivalence ratio in a range $0.5 < \phi < 1$.

21. The pressure-measuring method in accordance with claim 12, and further comprising coupling the two electrodes to a constant current source while measuring the voltage change.

* * * * *